(12) United States Patent
Patel et al.

(10) Patent No.: US 6,192,474 B1
(45) Date of Patent: Feb. 20, 2001

(54) METHOD FOR ESTABLISHING A KEY USING OVER-THE-AIR COMMUNICATION AND PASSWORD PROTOCOL AND PASSWORD PROTOCOL

(75) Inventors: Sarvar Patel, Montville, NJ (US); Adam L. Berenzweig, New York, NY (US)

(73) Assignee: Lucent Technologies Inc., Murray Hill, NJ (US)

(*) Notice: Under 35 U.S.C. 154(b), the term of this patent shall be extended for 0 days.

(21) Appl. No.: 09/127,769

(22) Filed: Jul. 31, 1998

(51) Int. Cl.$^7$ ........................................... G06F 11/30
(52) U.S. Cl. ........................ 713/171; 713/168; 713/182; 713/184; 380/255; 380/283; 380/28; 380/44
(58) Field of Search ........................ 713/171, 168, 713/182, 184; 380/255, 283, 44, 28, 267

(56) References Cited

U.S. PATENT DOCUMENTS 5,153,919  10/1992  Reeds, III et al. .

OTHER PUBLICATIONS

M. Bellare and P. Rogaway, Entity authentication and key distribution, *Advances in Cryptology—Crypto*, 1993.
S. Bellovin and M. Merritt, Encrypted key exchange: password–based protocols secure against dictionary attacks, *IEEE computer society symposium on research in security and privacy*, 72–84 May 1992.
R. Bird, I. Gopal, A. Herzberg, P. Janson, S. Kutten, R. Molva, and M. Yung, Systematic design of two–party authentication protocols, *Advances in Cryptology—Crypto*, 1991.
M. Blum and S. Micali, How to generate cryptographically strong sequences of pseudo random bits, *SIAM J. Computing*, 13 No. 4:850–864, 1984.
R. B. Boppana and R. Hirschfeld, Pseudorrandom generators and complexity classes, *Advances in Computing Research*, 5 (S. Micali, Ed.), JAI Press, CT.
U.S. Department of Commerce/N.I.S.T., *Digital Signature Standard*, FIPS 186, May 1994.
O. Goldreich and L. A. Levin, A hard–core predicate for all one way functions, *Proceedings of 21$^{st}$ STOC*, 25–32, 1989.
S. Goldwasser and A. Micali, Probabilistic encryption, *Journal of Computer and Systems Science*, 28: 270–299, 1984.
L. Gong, T. Lomas, R. Needham and J. Saltzer, Protecting poorly chosen secrets from guessing attacks, *IEEE Journal on Selected Areas in Communications*, 11(5): 648–656, Jun. 1993.
EIA/TIA, Cellular Radio Telecommunications Intersystem Operations IS–41 Rev. D, 1997.
T. Lomas, L. Gong, J. Saltzer and R. Needham, Reducing Risks from Poorly Chosen Keys, *Proceedings of the 12$^{th}$ ACM Symposium on Operating System Principles, ACM Operating Systems Review*, 23(5): 14–18, Dec. 1989.
S. Patel, Information Leakage in Encrypted Key Exchange, *Proceedings of DIMACS workshop on Network Threats*, 38: 33–40, Dec. 1996.

(List continued on next page.)

*Primary Examiner*—Thomas R. Peeso

(57) ABSTRACT

In the password protocol, the communicating parties exchange calculation results, which each include an exponential, to generate a key. In generating the calculation results, each party adds the password to their respective exponential. If the authorizing information previously sent by one party is acceptable to the other party, then this other party uses the key established according to the password protocol. The channel authorizing information is sent over a secure communication channel. The secure communication channel is also used in other embodiments to verify a hash on at least one calculation result sent between the parties. If the hash is verified, then a key is established using the calculation results sent between the parties.

26 Claims, 3 Drawing Sheets

OTHER PUBLICATIONS

S. Patel, Number theoretic attacks on secure password schemes, *IEEE symposium on security and privacy*, 236–247, May 1997.

S. Patel, Weaknesses of the north american wireless authentication protocol,*IEEE Personal Communications*, 40–44, Jun. 1997.

A. C. Yao, Theory and applications of trapdoor functions, *Proceedings of 23$^{rd}$ FOCS*, 80–91, 1982.

M. Beller, L. Chang and Y. Yacobi, Privacy and authentication on a portable communication system, *IEEE J. Selected Areas in Communications*, 11(6): 821–829, 1993.

C. Carroll, Y. Frankel and Y. Tsiounis, Efficient key distribution for slow computing devices: Achieving fast over the air activation for wireless systems, *IEEE symposium on security and privacy*, May 1998.

TIA/EIA Interim Standard, *Over–the Air Service Provisioning of Mobile Stations in Spread Spectrum Systems*, IS–683–A, Jun. 1998.

E. Blossom, The VPI Protocol for Voice Privacy Devices, Dec. 1996.

O. Goldreich, S. Goldwasser and A. Micali, On the cryptographic applications of random functions, *Advances in Crpytology—Crypto*, 1984.

D. Jablon, Strong Password–Only Authenticated Key Exchange, *ACM SIG–COMM Computer Communications Review*, Oct. 1996.

S. Lucks, Open Key Exchange: How to defeat dictionary attacks without encrypting public keys, Proceedings of the Security Protocol Workshop '97, 1997.

Oded Goldreich, Shafi Goldwasser, Silvio Micali, How to Construct Random Functions, Journal of the Association for Computing Machinery, vol. 33, No. 4, pp. 792–807, Oct. 1986.

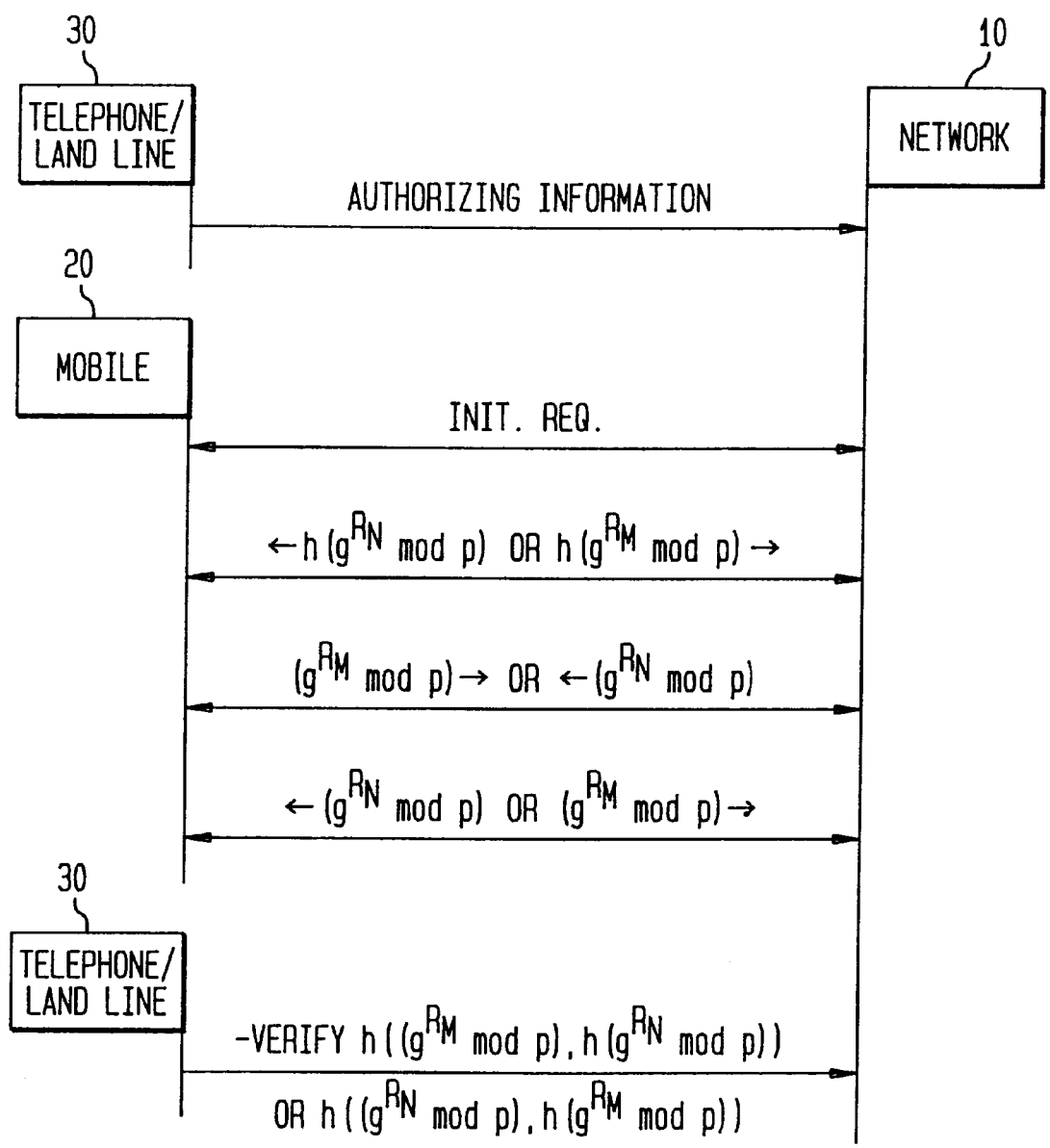

METHOD FOR ESTABLISHING A KEY USING OVER-THE-AIR COMMUNICATION AND PASSWORD PROTOCOL AND PASSWORD PROTOCOL

RELATED APPLICATIONS

The following applications, filed concurrently with the subject application, are related to the subject application and are hereby incorporated by reference in their entirety: application no. unknown entitled METHOD FOR TWO PARTY AUTHENTICATION AND KEY AGREEMENT by one of the inventors of the subject application; application no. unknown entitled METHOD FOR UPDATING SECRET SHARED DATA IN A WIRELESS COMMUNICATION SYSTEM by one of the inventors of the subject application; application no. unknown entitled METHOD FOR TRANSFERRING SENSITIVE INFORMATION USING INTIALLY UNSECURED COMMUNICATION by one of the inventors of the subject application; and application no. unknown entitled METHOD FOR SECURING OVER-THE-AIR COMMUNICATION IN A WIRELESS SYSTEM by one of the inventors of the subject application.

BACKGROUND OF THE INVENTION

1. Field of the Invention

The present invention relates to a password protocol and a method for establishing a key using over-the-air communication and, in one embodiment, the password protocol.

2. Description of Related Art

In a wireless communication system, the handsets, often called mobiles, purchased by mobile users are typically taken to a network service provider, and long keys and parameters are entered into the handset to activate service. The network of the service provider also maintains and associates with the mobile, a copy of the long keys and parameters for the mobile. As is well-known, based on these long keys and parameters, information can be securely transferred between the network and the mobile over the air.

Alternatively, the user receives long keys from the service provider over a secure communication channel, like a telephone/land line, and must manually enter these codes into the mobile.

Because the transfer of the long keys and parameters is performed via a telephone/land line or at the network service provider as opposed to over the air, the transfer is secure against over the air attacks. However, this method of securely transferring information places certain burdens and restrictions on the mobile user. Preferably, the mobile user should be able to buy their handsets and then get service from any service provider without physically taking the handsets to the provider's location or having to manually, and error free, enter long keys into the mobile. The capability to activate and provision the mobile remotely is part of the North American wireless standards, and is referred to as "over the air service provisioning" (OTASP).

Currently, the North American Cellular standard IS41-C specifies an OTASP protocol using the well-known Diffe-Hellman (DH) key agreement for establishing a secret key between two parties. FIG. 1 illustrates the application of the DH key agreement to establishing a secret key between a mobile 20 and a network 10 used in IS41-C. Namely, FIG. 1 shows, in a simplified form for clarity, the communication between a network 10 and a mobile 20 according to the DH key agreement. As used herein, the term network refers to the authentication centers, home location registers, visiting location registers, mobile switching centers, and base stations operated by a network service provider.

The network 10 generates a random number RN, and calculates ($g^{R_N}$ mod p). As shown in FIG. 1, the network 10 sends a 512-bit prime number p, the generator g of the group generated by the prime number p, and ($g^{R_N}$ mod p) to the mobile 20. Next, the mobile 20 generates a random number $R_M$, calculates ($g^{R_M}$ mod p), and sends ($g^{R_M}$ mod p) to the network 10.

The mobile 20 raises the received ($g^{R_N}$ mod p) from the network 10 to the power $R_M$ to obtain ($g^{R_M R_N}$ mod p). The network 10 raises the received ($g^{R_M}$ mod p) from the mobile 20 to the power $R_N$ to also obtain ($g^{R_M R_N}$ mod p). Both the mobile 20 and the network 10 obtain the same result, and establish the 64 least significant bits as the long-lived key called the A-key. The A-key serves as a root key for deriving other keys used in securing the communication between the mobile 20 and the network 10.

One of the problems with the DH key exchange is that it is unauthenticated and susceptible to a man-in-the-middle attack. For instance, in the above mobile-network two party example, an attacker can impersonate the network 10 and then in turn impersonate the mobile 20 to the network 10. This way the attacker can select and know the A-key as it relays messages between the mobile 20 and the network 10 to satisfy the authorization requirements. The DH key exchange is also susceptible to off-line dictionary attacks.

Another well-known protocol for protecting the over-the-air transfer of information, such as the A-key, is the Diffe-Hellman Encrypted Key Exchange (DH-EKE). DH-EKE is a password based protocol for exchanging information, and assumes that both the mobile user and the network service provider have established a password prior to the over-the-air transfer. Unlike the DH key exchange system discussed with respect to FIG. 1, the DH-EKE protects against man-in-the-middle attacks and off-line dictionary attacks.

The DH-EKE will be described with respect to FIG. 2, which illustrates the communication between the mobile 20 and the network 10 according to the DH-EKE protocol. As shown, the mobile 20 sends a 512-bit prime number p and the generator g to the network 10 along with ($g^{R_M}$ mod p) encrypted according to an encryption/decryption algorithm ENC using the password P, known to the mobile user and the network 10, as the encryption key. This calculation is represented as $ENC_P$ ($g^{R_M}$ mod p). The network 10 decrypts ($g^{R_M}$ mod p) using the password P, and calculates ($g^{R_M}$ mod p)$^{R_N}$, which equals ($g^{R_M R_N}$ mod p). The network 10 selects ($g^{R_M R_N}$ mod p), a hash of this value, or some portion thereof as a session key SK.

The network 10 then sends ($g^{R_N}$ mod p) encrypted according to ENC using the password P and a random number $R_N'$ encrypted according to ENC using the session key SK to the mobile 20. The mobile 20 decrypts ($g^{R_N}$ mod p) using the password P, and calculates ($g^{R_N}$ mod p)$^{R_M}$, which equals ($g^{R_M R_N}$ mod p). Then, the mobile 20 selects ($g^{R_M R_N}$ mod p), the hash thereof, or a portion thereof as did the network 10 as the session key SK. Using the session key SK, the mobile 20 then decrypts $R_N'$.

Next, the mobile 20 generates a random number $R_M'$, encrypts the random numbers $R_M'$ and $R_N'$ according to ENC using the session key SK, and sends the encrypted random numbers $R_N'$ and $R_M'$ to the network 10. The network 10 decrypts the random numbers $R_N'$ and $R_M'$ using the session key SK, and determines whether the decrypted version of $R_N'$ equals the version of $R_N'$ originally sent to the mobile 20. The session key SK is verified by the network 10 when the decrypted version of $R_N{}'$ equals the version of $R_N{}'$ originally sent to the mobile 20.

The network 10 then sends the random number $R_M{}'$ encrypted according to ENC using the session key SK to the mobile 20. The mobile 20 decrypts the random number $R_M{}'$ using the session key SK, and determines whether the calculated version of $R_M{}'$ equals the version of $R_M{}'$ originally sent to the network 10. The session key SK is verified by the mobile 20 when the decrypted version of $R_M{}'$ equals the version of $R_M{}'$ originally sent to the network 10.

Once the network 10 and the mobile 20 have verified the session key SK, the session key SK is used as the A-key, and communication between the mobile 20 and the network 10 is reconfigured using the A-key.

While the DH-EKE protocol eliminates man-in-the-middle and off-line dictionary attacks, information may still leak, and an attacker may recover the password P.

SUMMARY OF THE PRESENT INVENTION

In the password protocol, the communicating parties exchange calculation results, which each include an exponential, to generate a key. In generating the calculation results, each party adds the password to their respective exponential. If the authorizing information previously sent by one party is acceptable to the other party, then this other party uses the key established according to the password protocol. The authorizing information is sent over a secure communication channel. By adding the password to the respective exponentials, less information on the password leaks and the computation becomes more efficient.

The secure communication channel is also used in other embodiments to verify a hash on at least one calculation result sent between the parties. Unlike the password protocol, however, the calculation results do not include the password. If the hash is verified, then a key is established using the calculation results sent between the parties. This verification process provides a measure of security prior to establishing the key.

The present invention has various applications including the wireless industry wherein the parties are a mobile user and a network.

BRIEF DESCRIPTION OF THE DRAWINGS

The present invention will become more fully understood from the detailed description given below and the accompanying drawings which are given by way of illustration only, wherein like reference numerals designate corresponding parts in the various drawings, and wherein:

FIG. 5 shows the communication between a network and a mobile user via a telephone/landline and a mobile according to a third embodiment of the present invention.

DETAILED DESCRIPTION OF THE PREFERRED EMBODIMENTS

The system and method according to the present invention for establishing a key using over-the-air communication will be described as applied to a wireless system. Namely, establishing a key between a mobile 20 and a network 10 using both a telephone/land line 30 and, according to one embodiment, a password protocol will be described.

Figure 1:
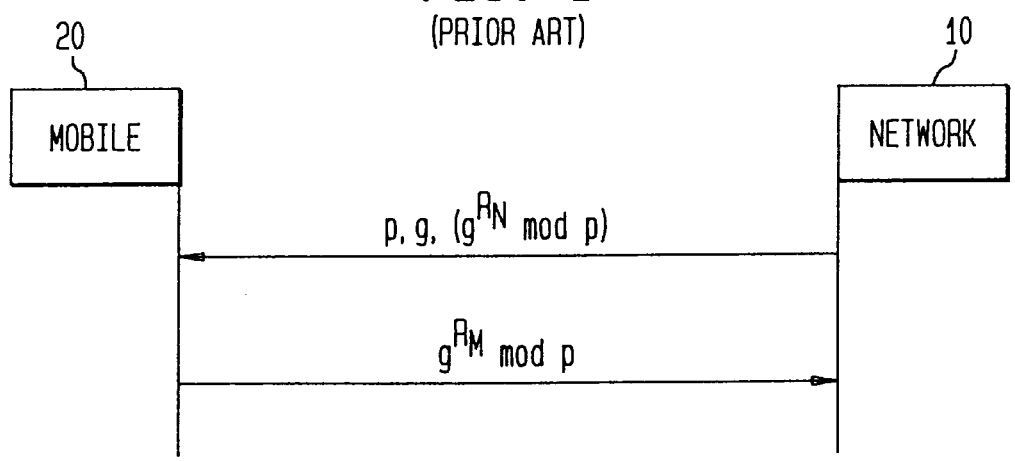
FIG. 1 shows the communication between a network and a mobile according to the Diffe-Hellman key agreement.
Figure 2:
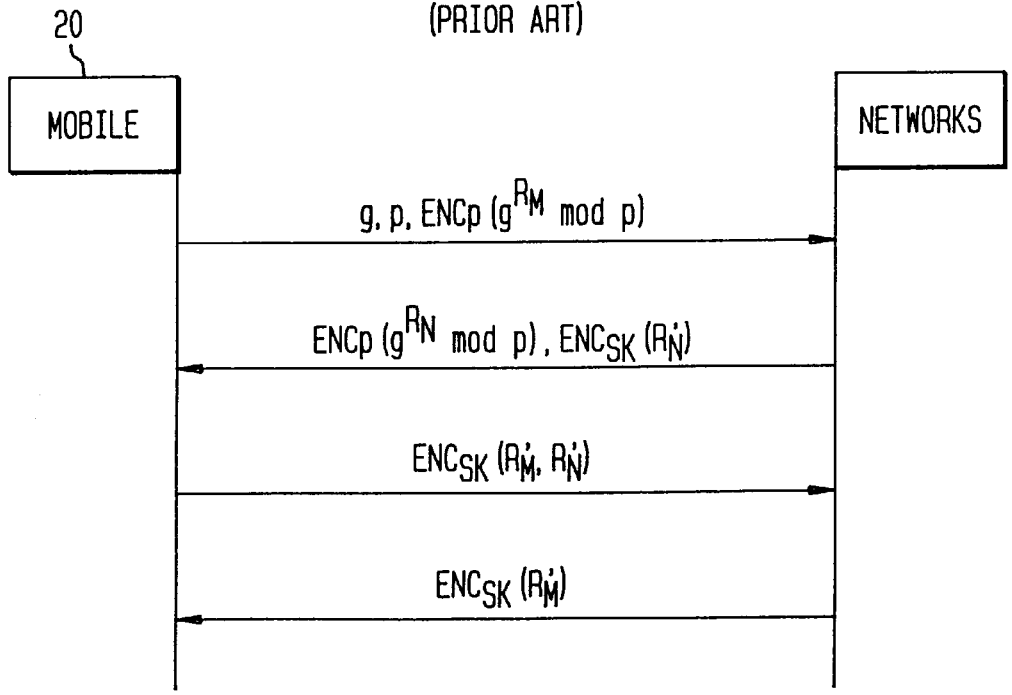
FIG. 2 shows the communication between a network and a mobile according to the Diffe-Hellman Encrypted Key Exchange protocol.
Figure 3:
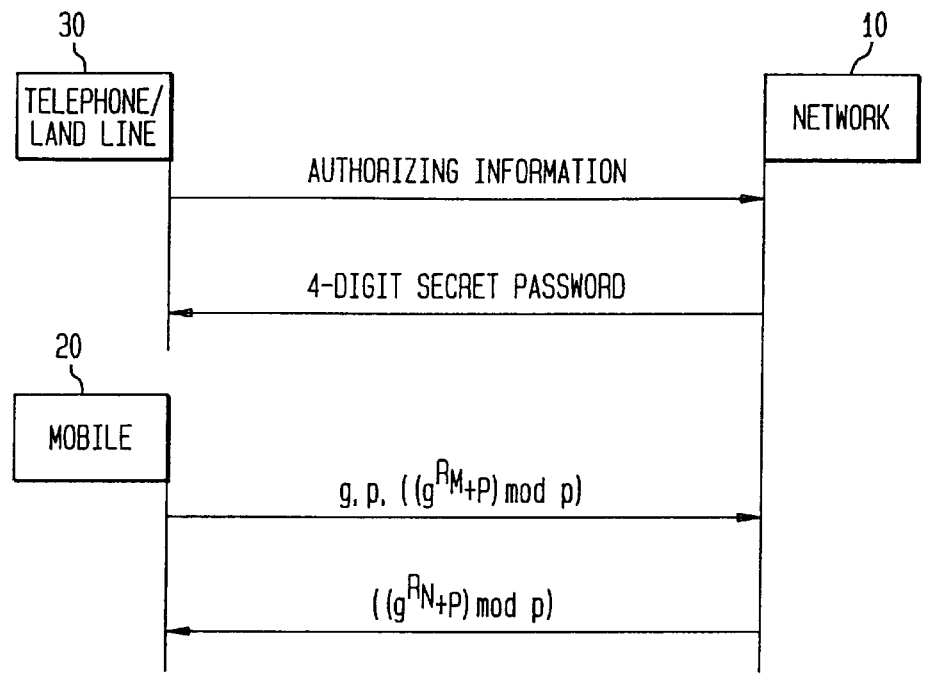
FIG. 3 shows the communication between a network and a mobile user via a telephone/landline and a mobile according to a first embodiment of the present invention.

FIG. 3 illustrates the communication between (1) the network provider and the network 10, collectively referred to as the network 10, and (2) a mobile user via a telephone/land line 30 and the mobile 20 according to a first embodiment of the present invention. As shown, via the telephone/land line 30 a mobile user provides the network 10 with authorizing information (e.g., credit card information for billing purposes). If the network 10 accepts the authorizing information, the network 10 provides the mobile user with a four (4) digit password P via the telephone/land line 30. It should be, however, that the password P may be more or less than four digits.

The mobile user then enters this short password P into the mobile 20 as part of an activation program. Using a random number generator, the mobile 20 generates a random number $R_M$, and using a pre-stored 512-bit prime number p and the generator g of the group generated by the prime number p, calculates $((g^{R_M}+P) \bmod p)$.

The mobile 20 sends the prime number p and the generator g to the network 10 along with $((g^{R_M}+P) \bmod p)$. Because $((g^{R_M}+P) \bmod P)$ equals $(g^{R_M} \bmod p)+(P \bmod p)$ and the network 10 knows the password P, the network 10 calculates $(P \bmod p)$ and extracts $(g^{R_M} \bmod P)$ from $((g^{R_M}+P) \bmod p)$. After generating a random number $R_N$, the network 10 calculates $(g^{R_M} \bmod p)^{R_N}$, which equals $(g^{R_M R_N} \bmod p)$. The network 10 selects $(g^{R_M R_N} \bmod p)$, the hash thereof, or a portion thereof as a session key SK. For example, if incorporated in the IS41 protocol, the 64 least significant bits of $(g^{R_M R_N} \bmod p)$ would be selected as a session key SK.

The network 10 then calculates and sends $((g^{R_N}+P) \bmod p)$ to the mobile 20. The mobile 20, after extracting $(g^{R_N} \bmod p)$, calculates $(g^{R_N} \bmod p)^{R_M}$, which equals $(g^{R_M R_N} \bmod p)$. The mobile 20 selects $(g^{R_M R_N} \bmod p)$, the hash thereof, or a portion thereof in the same manner as the network 10 as a session key SK. For example, if incorporated in the IS41 protocol, the 64 least significant bits of $(g^{R_M R_N} \bmod p)$ would be selected as a session key SK.

Once the network 10 and the mobile 20 have the session key SK, the session key SK is used as the A-key, and communication between the mobile 20 and the network 10 is reconfigured using the A-key.

The over-the-air exchange according to the present invention discussed above uses a password protocol (i.e., the transfers of $((g^{R_M}+P) \bmod p)$ and $((g^{R_N}+P) \bmod p)$ in FIG. 3) which does not leak information to the degree that the DH-EKE protocol leaks information. Furthermore, this password protocol is secure because removing the effect of the password does not reveal anything. $R_M$ and $R_N$ are uniform random numbers. Raising them to g and then reducing by mod p also results in uniform and random numbers because of the permutation induced by exponentiation mod p. So, adding a P mod p to that number does not change the uniformity and randomness of the result. All numbers are equally likely, and removing the effects of other passwords also creates equally likely numbers, so there is no leaking of information. One skilled in the art will also appreciate that the password protocol discussed above is not limited in application to the over-the-air exchange of information. For example, this password protocol could be applied to entity authentication and session key agreement.

Figure 4:
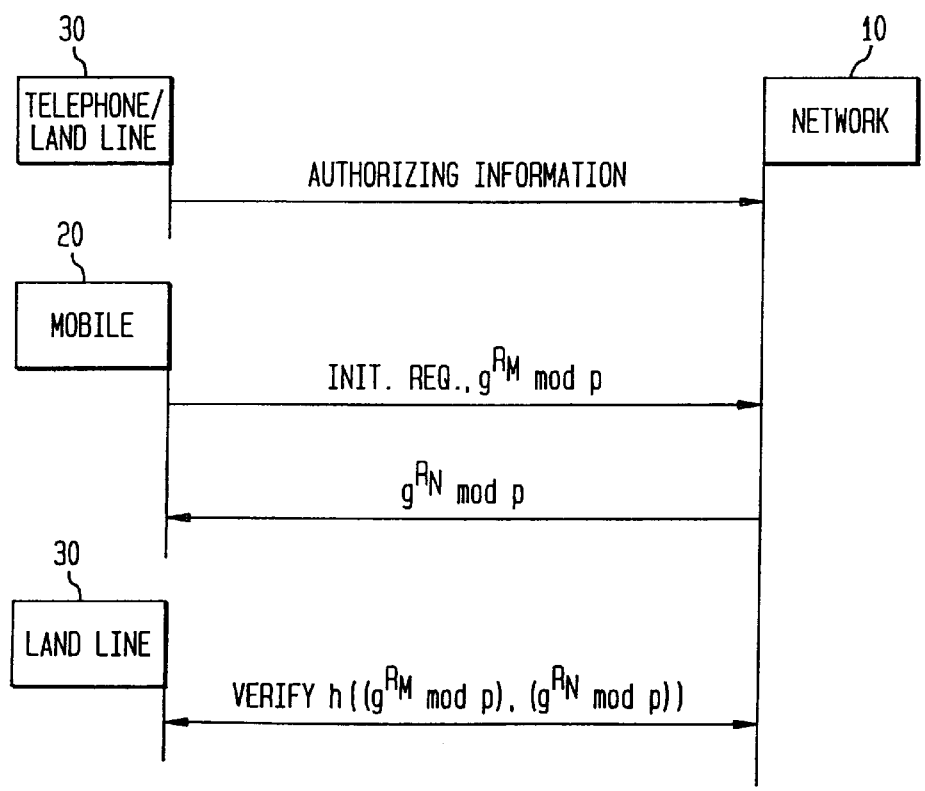
FIG. 4 shows the communication between a network and a mobile user via a telephone/landline and a mobile according to a second embodiment of the present invention.

A second embodiment of the present invention will now be described with respect to FIG. 4. FIG. 4 illustrates the communication between the network 10 and a mobile user via the telephone/land line 30 and the mobile 20 according to a second embodiment of the present invention. As shown, via the telephone/land line 30 a mobile user provides the network 10 with authorizing information. If the network 10 accepts the authorizing information, then when the mobile 20 issues an initialization request as part of the mobile's initialization procedure, the initialization process will continue.

For example, the mobile 20 generates a random number $R_M$, calculates ($g^{R_M}$ mod p), and sends an initialization request along with ($g^{R_M}$ mod p) to the network 10.

The network 10 generates a random number $R_N$ and sends ($g^{R_N}$ mod p) to the mobile 20.

Both the mobile 20 and the network 10 performs $h(($g^{R_N}$ mod p), ($g^{R_M}$ mod p))$, which is a collective hash on ($g^{R_N}$ mod p) and ($g^{R_M}$ mod P) using the well-known Secure Hashing Algorithm (SHA). It should be noted, however, that any hashing algorithm can be used. The mobile 20 displays the results of the hash, and the mobile user, via the telephone/land line 30, gives the digits of the hash to the network 10.

If the network 10 finds a match between the digits provided by the mobile user and the hash performed by the network 10, then communication is verified and the A-key is established as ($g^{R_M R_N}$ mod p), the hash thereof, or a portion thereof. Namely, the mobile 20 will have established the A-key as such, but the network 10 will only associate this A-key with the mobile 20 if the hash is verified.

As an alternative, or third embodiment, along with the authorizing information, the mobile user 20 supplies sufficient information (e.g., the mobile's identification number, etc.) to the network 10 such that the network 10 can contact the mobile 20 and send ($g^{R_N}$ mod p) as an initial communication.

This third embodiment is subject to a birthday attack; namely, half as many attempts by a man-in-the-middle need to be made to attack this protocol than one would initially assume. However, according to an alternative of the third embodiment, if the hash is changed to $h(($g^{R_M}$ mod p), ($g^{R_N}$ mod p), ($g^{R_M R_N}$ mod p))$, then the attack is significantly slowed because the attacker must do exponentiation along with the hashes.

As another alternative to the third embodiment, the hash performed to verify communication between the mobile 20 and the network 10 includes the identification number of the mobile 20.

According to a further modification of the third embodiment (i.e., a fourth embodiment of the present invention), the mobile 20 does not send ($g^{R_M}$ mod p) to the network 10, as shown in FIG. 4, until after receiving ($g^{R_N}$ mod p) from the network 10. In the third embodiment, the man-in-the-middle attacker was able to see both ($g^{R_M}$ mod p) and ($g^{R_N}$ mod p), and thus exploit the birthday attack. According to this fourth embodiment, the attacker has to commit to a ($g^{R_N}$ mod p) before the mobile 20 responds with a ($g^{R_M}$ mod p). This reduces, by one, the attacker's degrees of freedom.

FIG. 5 illustrates the communication between the network 10 and a mobile user via the telephone/land line 30 and the mobile 20 according to a fifth embodiment of the present invention. As shown, via the telephone/land line 30 a mobile user provides the network 10 with authorizing information. As discussed above, along with the authorizing information, the mobile 20 can supply the network 10 with sufficient information (e.g., the mobile identifier, etc.) for the network 10 to make initial contact with the mobile 20. If the network 10 accepts the authorizing information, then the initialization process will continue.

The initialization process continues with one of the mobile 20 and the network 10 sending an initialization request to the other party.

For example, if the mobile 20 sends the initialization request, then the network 10 generates a random number $R_N$, calculates ($g^{R_N}$ mod p) and the hash of ($g^{R_N}$ mod p), and sends $h(g^{R_N}$ mod p) to the mobile 20. The mobile 20 generates a random number $R_M$, calculates ($g^{R_M}$ mod p), and sends ($g^{R_M}$ mod p) to the network 10. The network 10 in return sends ($g^{R_N}$ mod p) to the mobile 20.

Next, the mobile 20 calculates the hash of the received ($g^{R_N}$ mod p), and confirms whether this calculated version of $h(g^{R_N}$ mod p) equals the version initially received from the network 10. If confirmed, the initialization process continues.

Namely, both the mobile 20 and the network 10 perform $h(($g^{R_M}$ mod p), $h(g^{R_N}$ mod p))$. The mobile 20 displays the results of the hash, and the mobile user, via the telephone/land line 30, gives the digits of the hash to the network 10.

If the network 10 finds a match with the hash performed by the network 10, then communication is verified and the A-key is established as ($g^{R_M R_N}$ mod p), the hash thereof, or a portion thereof. Namely, the mobile 20 will have established the A-key as such, but the network 10 will only associate this A-key with the mobile 20 if the hash is verified.

As discussed above, instead of the mobile 20 sending the initialization request, the network 10 sends the initialization request. If the network 10 sends the initialization request, then the mobile 20 generates a random number $R_M$, calculates ($g^{R_M}$ mod p), calculates the hash of ($g^{R_M}$ mod p), and sends $h(g^{R_M}$ mod p) to the network 10. The network 10 in return generates a random number $R_N$, calculates ($g^{R_N}$ mod p) and sends ($g^{R_N}$ mod p) to the mobile 20.

The mobile 20 sends ($g^{R_M}$ mod p) to the network 10, and the network 10 calculates the hash of ($g^{R_M}$ mod p). The network 10 then confirms whether the calculated version of $h(g^{R_M}$ mod p) equals the version initially received from the mobile 20. If equal, the initialization process continues.

Namely, both the mobile 20 and the network 10 perform $h(($g^{R_N}$ mod p), $h(g^{R_M}$ mod p))$. The mobile 20 displays the results of the hash, and the mobile user, via the telephone/land line 30, gives the digits of the hash to the network 10.

If the network 10 finds a match with the hash performed by the network 10, then communication is verified and the A-key is established as ($g^{R_M R_N}$ mod p), the hash thereof, or a portion thereof. Namely, the mobile 20 will have established the A-key as such, but the network 10 will only associate this A-key with the mobile 20 if the hash is verified.

As a further alternative, the final hash performed to verify communication between the mobile 20 and the network 10 includes the identification number of the mobile 20.

A man-in-the-middle attacker cannot use a birthday type attack because when acting as the network 10 he has to commit to the exponential he is using (via the hash) before he sees the mobile users exponential. Similarly, the attacker, when acting as the mobile 20, has to commit to the exponential before the value of the network's exponential, associated with the hash, is revealed.

In some of the embodiments of the present invention, the prime number p and the generator g were assumed to be fixed and pre-stored in the mobile 20. However, if that is not the case, then the attacker can replace g and p with g' and p', which will allow the attacker to calculate the discrete logarithm efficiently. If g and p are also sent over the air then they should also be used as part of the hash calculation, $h(g,p, (g^{R_M} \bmod p),(g^{R_N} \bmod p))$ in order to stop the substitution of g and p by the attacker.

Furthermore, although each embodiment was described using a telephone/land line 30, other forms of secure communication could replace the telephone/land line 30. For instance, a previously activated mobile could replace the telephone/land line. Alternatively, but less secure, the telephone/land line communications could be performed over a voice channel between the mobile 20 and the network 10, and the remaining communication would occur over a control channel between the mobile 20 and the network 10.

The invention being thus described, it will be obvious that the same may be varied in many ways. Such variations are not to be regarded as a departure from the spirit and scope of the invention, and all such modifications are intended to be included within the scope of the following claims.

We claim:

1. A method of establishing a key at a first party using a password, comprising:
   (a) generating, at said first party, a first random number $R_M$;
   (b) producing a first calculation result by calculating $((g^{R_M}+P) \bmod p)$, where P is a password, p is a prime number, and g is a generator of a group generated by said prime number p;
   (c) sending said prime number p, said generator g, and said first calculation result to a second party;
   (d) receiving a second calculation result equal to $((g^{R_N}+P) \bmod p)$ from said second party, where $R_N$ is a second random number; and
   (e) establishing a key based on said second calculation result and said first random number.

2. The method of claim 1, wherein said step (e) comprises:
   (e1) calculating $(P \bmod p)$;
   (e2) subtracting $(P \bmod p)$ from said second calculation result of $((g^{R_N}+P) \bmod p)$ to obtain $(g^{R_N} \bmod p)$; and
   (e3) establishing said key based on $(g^{R_N} \bmod p)$ and said first random number.

3. The method of claim 1, wherein said first party is a mobile in a wireless system and said second party is a network.

4. The method of claim 1, prior to said step (b), further comprising:
   (f) sending authorizing information over a secure communication channel to said second party; and
   (g) receiving said password from said second party over said secure communication channel if said second party accepts said authorizing information.

5. The method of claim 4, wherein
   said first party is a mobile user in a wireless system and said second party is a network; and
   said secure communication channel is a land line.

6. A method of establishing a key at a first party using a password, comprising:
   (a) receiving, at a first party, a prime number p, a generator g of a group generated by said prime number p, and a first calculation result from a second party, said first calculation result being a result of calculating $((g^{R_M}+P) \bmod p)$, where P is a password and $R_M$ is a first random number;
   (b) generating a second random number $R_N$;
   (c) producing a second calculation result by calculating $((g^{R_N}+P) \bmod p)$;
   (d) sending said second calculation result to said second party; and
   (e) establishing a key based on said first calculation result and said second random number.

7. The method of claim 6, wherein said step (e) comprises:
   (e1) calculating $(P \bmod p)$;
   (e2) subtracting $(P \bmod p)$ from said first calculation result of $((g^{R_M}+P) \bmod p)$ to obtain $(g^{R_M} \bmod p)$; and
   (e3) establishing said key based on $(g^{R_M} \bmod p)$ and said second random number.

8. The method of claim 6, wherein said first party is a network in a wireless system and said second party is a mobile.

9. The method of claim 6, prior to said step (a), further comprising:
   (f) receiving authorizing information over a secure communication channel from said second party; and
   (g) sending said password to said second party over said secure communication channel if said authorizing information is acceptable.

10. The method of claim 9, wherein
    said first party is a network in a wireless system and said second party is a mobile user; and
    said secure communication channel is a land line.

11. A method of establishing a key at a first party, comprising:
    (a) generating, at said first party, a first random number $R_M$;
    (b) producing a first calculation result by calculating $(g^{R_M} \bmod p)$, where p is a prime number, and g is a generator of a group generated by said prime number p;
    (c) sending said first calculation result to a second party;
    (d) receiving a second calculation result equal to $(g^{R_N} \bmod p)$ from said second party, where $R_N$ is a second random number;
    (e) calculating a first hash of at least said first calculation result;
    (f) sending said first hash to said second party over a first secure communication channel; and
    (g) establishing a key based on said first random number and said second calculation result.

12. The method of claim 11, further comprising:
    (h) sending authorizing information to said second party over a second secure communication channel; and wherein
    said step (d) receives said second calculation result if said authorizing information is acceptable to said second party.

13. The method of claim 12, wherein
    said step (h) sends an identifier for said first party along with said authorizing information; and
    said step (d) is performed one of prior to and concurrent with said step (c).

14. The method of claim 13, wherein said step (c) is not performed until after said step (d).

15. The method of claim 14, wherein
    said step (h) sends an identifier for said first party along with said authorizing information; and said step (e) calculates said first hash as a hash of at least said first calculation result and said identifier for said first party.

16. The method of claim 14, wherein said step (e) calculates said first hash as a hash of said first and second calculation results and $(g\char`\^R_N \bmod p)\char`\^R_M$.

17. The method of claim 11, wherein said step (e) calculates said first hash as a hash of at least said first and second calculation results.

18. The method of claim 11, wherein said first party is a mobile user in a wireless system and said second party is a network.

19. A method of establishing a key at a first party, comprising:
 (a) receiving a first calculation result from a second party, said first calculation result being a result of calculating $(g\char`\^R_M \bmod p)$ where $R_M$ is a first random number, p is a prime number, and g is a generator of a group generated by said prime number p;
 (b) generating a second random number $R_N$;
 (c) producing a second calculation result by calculating $(g\char`\^R_N \bmod p)$;
 (d) sending said second calculation result to said second party;
 (e) calculating a first hash of at least said first calculation result;
 (f) receiving a second hash from said second party over a first secure communication channel;
 (g) verifying said second party based on said first and second hashes; and
 (h) establishing a key based on said second random number and said first calculation result if said second party is verified.

20. The method of claim 19, further comprising:
 (i) receiving authorizing information from said second party over a second secure communication channel; and wherein
 said step (d) sends said second calculation result to said second party if said authorizing information is acceptable.

21. The method of claim 20, wherein
 said step (i) receives an identifier for said second party along with said authorizing information; and
 said step (d) is performed one of prior to and concurrent with said step (a).

22. The method of claim 21, wherein said step (a) is not performed until after said step (d).

23. The method of claim 22, wherein
 said step (i) receives an identifier for said second party along with said authorizing information; and
 said step (e) calculates said first hash as a hash of at least said first calculation result and said identifier for said second party.

24. The method of claim 22, wherein said step (e) calculates said first hash as a hash of said first and second calculation results and $(g\char`\^R_M \bmod p)\char`\^R_N$.

25. The method of claim 19, wherein said step (e) calculates said first hash as a hash of at least said first and second calculation results.

26. The method of claim 19, wherein said first party is a network in a wireless system and said second party is a mobile user.

* * * * *